Figure 2:
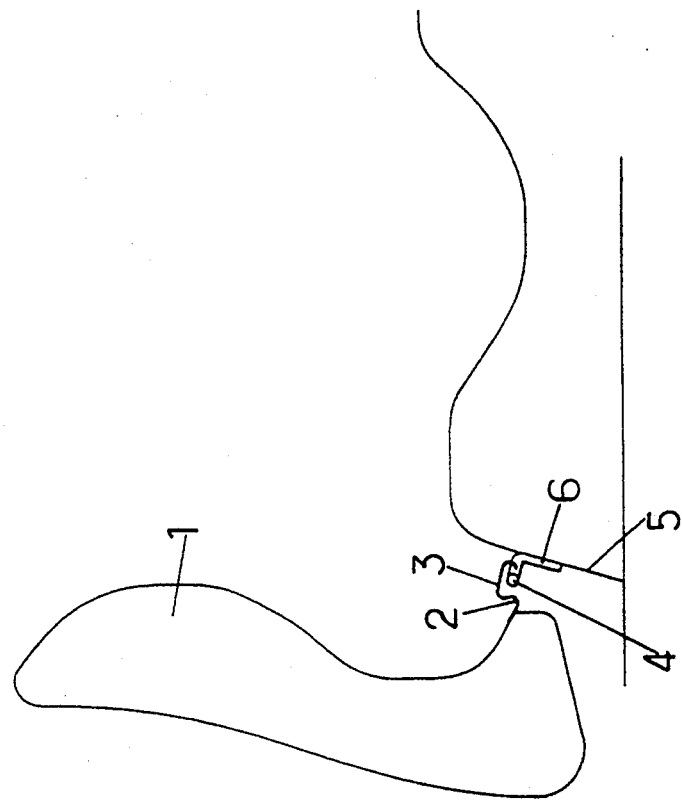

United States Patent [19]

Doussot et al.

[11] Patent Number: 5,426,832
[45] Date of Patent: Jun. 27, 1995

[54] MANUALLY OPERATED REMOVEABLE AND PIVOTING FIXING CLIP, AND CONNECTION DEVICE INCLUDING IT, PARTICULARLY FOR A VEHICLE SEAT CUSHION

[75] Inventors: Francois Doussot, Raon L'Etape; Thierry Stouvenel, Senones; Jacky Aries, La Voivre; Vincent Rapeene, Epinal, all of France

[73] Assignee: Bertrand Faure Automobile "BFA", Massy, France

[21] Appl. No.: 134,840

[22] Filed: Oct. 12, 1993

[30] Foreign Application Priority Data

Oct. 9, 1992 [FR] France ............... 92 12049
Mar. 1, 1993 [FR] France ............... 93 02329

[51] Int. Cl.$^6$ ............................................. F16L 3/08
[52] U.S. Cl. ........................... 24/543; 403/106; 403/353; 403/397
[58] Field of Search ........... 24/543; 403/106, 330, 403/326, 353, 397, 11, 12, 155, 225, 226, 227, 220; 248/250

[56] References Cited

U.S. PATENT DOCUMENTS

| | | | |
|---|---|---|---|
| 3,405,429 | 10/1968 | Vazquez | 24/543 X |
| 3,496,616 | 2/1970 | Vazquez | 24/543 X |
| 3,524,226 | 8/1970 | Brown | 24/543 X |
| 4,646,998 | 3/1987 | Pate | 248/250 |
| 4,700,913 | 10/1987 | Hirano et al. | 24/543 X |
| 4,899,614 | 2/1990 | Kataumi | 24/543 X |
| 4,917,340 | 4/1990 | Jüemann et al. | 24/543 X |
| 5,108,055 | 4/1992 | Kreinberg et al. | 24/543 X |
| 5,109,576 | 5/1992 | Teekell et al. | 24/543 X |
| 5,127,219 | 7/1992 | Herron et al. | 59/93 |
| 5,230,496 | 7/1993 | Shillington et al. | 24/543 X |
| 5,263,671 | 11/1993 | Baum | 24/543 X |
| 5,295,480 | 3/1994 | Zemo | 24/543 X |
| 5,337,987 | 8/1994 | Sawatsky | 24/543 X |

FOREIGN PATENT DOCUMENTS

| | | |
|---|---|---|
| 0170811 | 2/1986 | European Pat. Off. |
| 1293660 | 4/1962 | France |
| 1508000 | 12/1967 | France |
| 2166911 | 8/1973 | France |
| 1401352 | 7/1995 | United Kingdom |

*Primary Examiner*—Dave W. Arola
*Assistant Examiner*—Christopher J. Novosad
*Attorney, Agent, or Firm*—Larson and Taylor

[57] ABSTRACT

The invention relates to a manually operated fixing clip for joining together removably and so that they can pivot two elements one of which carries the clip and the other a rod forming a pivot pin. The clip has a flexible lip forming, together with another lip, an elastic pinching slit for the entrance of the rod into a housing. A movable bar connected to the clip by elastic tags is placed between two lips either to move them apart sufficiently to allow the rod to leave, or to block the flexible lip in order to prevent the rod from leaving, depending on the embodiment.

15 Claims, 6 Drawing Sheets

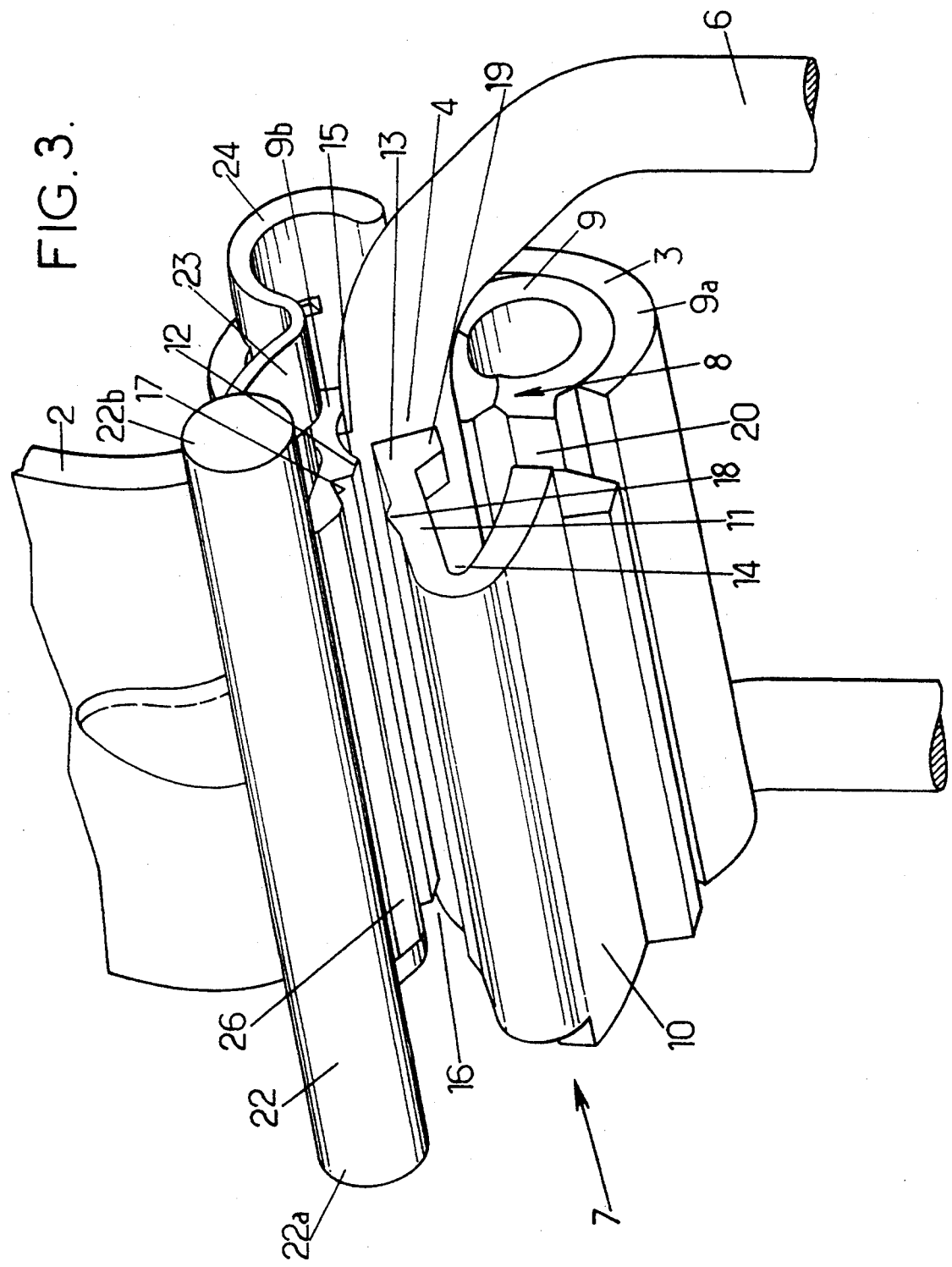

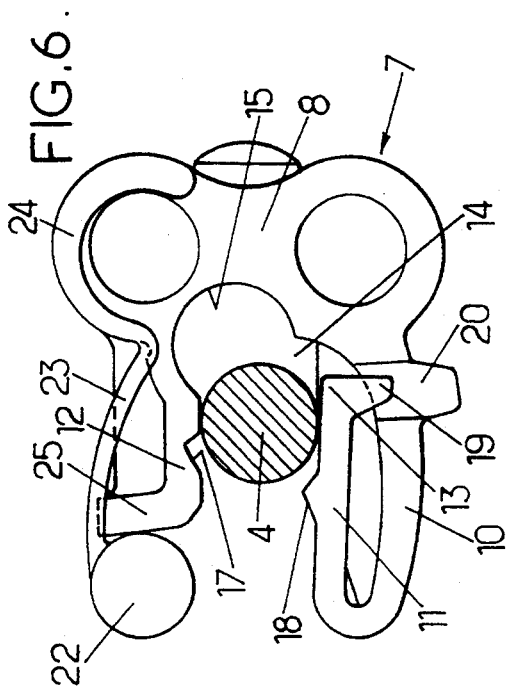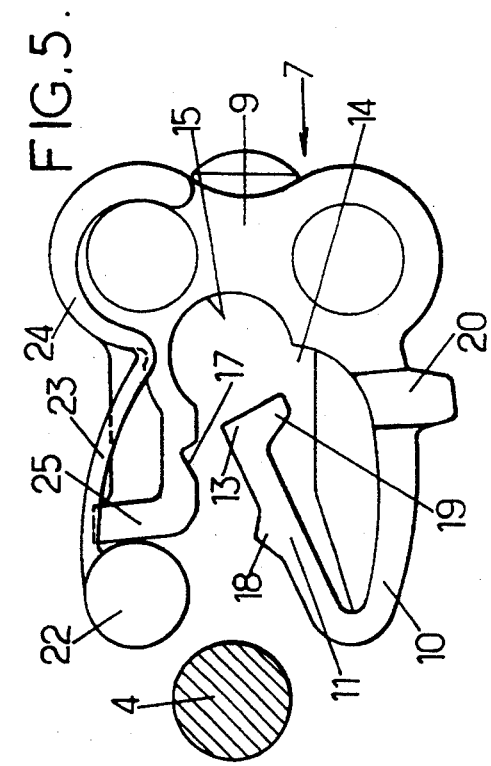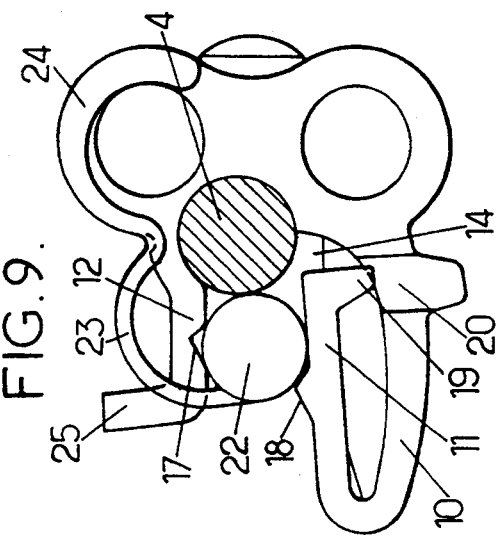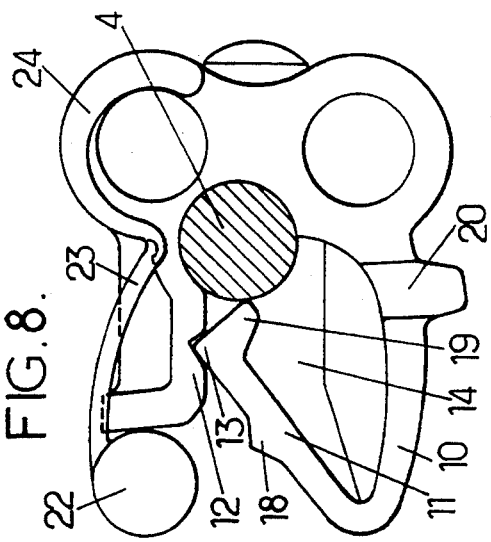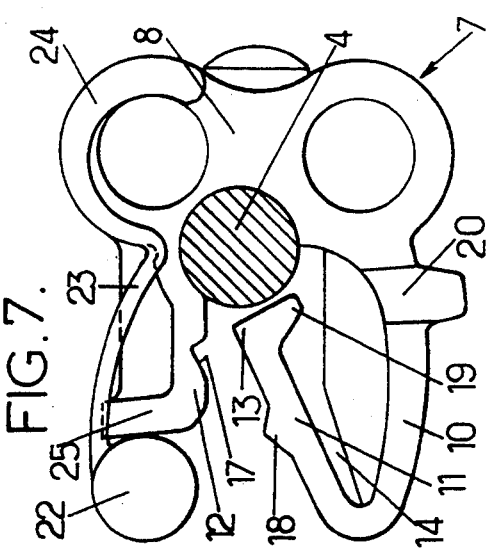

MANUALLY OPERATED REMOVEABLE AND PIVOTING FIXING CLIP, AND CONNECTION DEVICE INCLUDING IT, PARTICULARLY FOR A VEHICLE SEAT CUSHION

The invention relates to a manually operated fixing clip for joining together removably so that they can pivot two elements, one of which carries the clip and the other an anchoring rod, forming a pivot pin, and intended to interact with the clip.

In numerous industrial activities various applications are known in which an element has to be able to be fitted removably on a support element, using a fastener allowing relative pivoting movements of the element and of the support.

Such is particularly the case in the motor industry: in order to facilitate the servicing, repair, and initial fitting operations, an element such as a tilting rear tailgate, also known as a fifth door, of a motor vehicle, which in service pivots on the support which the body of the vehicle constitutes, must be fitted removably on this body. The removability of the fitting of a pivoting tailgate on a vehicle may also make it possible to improve the conditions for loading this vehicle.

Likewise, the constructors of motor vehicles have, for some years, offered their customers the possibility of increasing the volume available for storage in the boot of some vehicles by folding down the back rests of the seats or of the rear seat of these vehicles, and raising the seat cushion of these seats or of this rear seat by pivoting and/or removal.

This has led to the development and use of relatively complex, and therefore expensive, articulations, particularly with hinges, including at least two components interacting by relative pivoting and fixed, for example by screwing, one of them onto the body of the vehicle and the other onto the seat cushion framework.

As a result, any operation of fitting or dismantling the seat cushion by the user of the vehicle requires the operation of suitable tools, such as a screwdriver.

In addition, screwing at the factory, when the seat cushion is first fitted in the vehicle, is an operation which increases the fitting time, and therefore a factor in increasing the production costs.

Finally, since the parts of the seat cushion articulations which interact by pivoting are made of metal, these articulations are noisy in service, due to the metal-metal contact between their interacting parts.

An object of the invention is to propose a simple attachment mechanism facilitating the interventions of fitting and dismantling, for example of the pivoting seat cushion of a vehicle rear seat, by the user of the vehicle, without it being necessary to employ specific tools.

A second object of the invention is to propose a simple attachment mechanism making it possible to speed up the fitting at the factory, by eliminating the screwing time.

Another object of the invention is to propose such a simple mechanism which makes it possible to eliminate the noises in service which are due to the contacts between the components in relative movement.

To this end, the subject of the invention is a manually operated fixing clip of the aforementioned type, which is characterized in that it comprises, on the one hand, a relatively rigid body having a first housing intended to receive the anchoring rod and open towards the outside of the body via a first elastic pinching slit widening towards the outside of the body and delimited between two lips of the body, a first of which is elastically flexible and, on the other hand, a member which can move between a position for locking and a position for unlocking the anchoring rod in the first housing, of which positions one is a rest position and the other an active position of the moveable member which is connected to the body-by flexible means and can be moved manually at least from its rest position, in which it is outside the body, to its active position by forcible engagement in an elastic pinching slit also widening towards the outside of the body and also delimited between two lips of the body one of which is the said flexible lip, the assembly being arranged in such a fashion that the forcible engagement of the rod in the first elastic pinching slit when the movable member is not in the active position, can sufficiently push back the flexible lip to allow the rod to be inserted into the first housing in a position allowing a relative pivoting of the clip and of the rod, and in which the rod tends to be retained by a subsequent elastic return of the flexible lip and that next, the forcible engagement of the movable member in the elastic pinching slit which receives it can sufficiently push back the flexible lip to allow the movable member to come into its active position, in which it tends to be retained by a subsequent elastic return of the flexible lip.

Such a clip or fixing attachment has the advantage that building a movable member into the articulation component consisting of the body of the clip allows manual operation by the user of the clip and of the anchoring rod upon fitting and upon dismantling. Simultaneously, the fitting and dismantling times are short.

In a first advantageous embodiment, with automatic locking of the rod in the first housing when it enters the latter, the body has a U-shaped central recess, the bottom of which constitutes the first housing, and the flexible lip extends from a first end, joined to a rigid wall of the body to its other end which is free and is, in its rest position, in lined such that its said free end points towards the second lip of the first elastic pinching slit and towards the inside of the recess towards the first housing so that when the rod passes into the first elastic pinching slit, the flexible lip is pushed back towards the wall and that its free end constitutes, in its rest position, a locking means opposing the exit of the rod from the first housing, and in that the movable member, at rest in the position for locking the rod, is moved into its active position, which is a position for unlocking the rod by engagement in the said first elastic pinching slit so that it pushes back the flexible lip sufficiently towards the wall for the rod to be able to engage, from the first housing, between the two lips of the said first elastic pinching slit and is thus allowed to leave the first housing and the clip by sliding in the first elastic pinching slit.

In contrast, if it is desired for the locking of the rod in the first housing to be obtained only by moving the movable member from its rest position to its active position, then in a second advantageous embodiment the body has a second housing, intended to receive the movable member, and open towards the outside of the body via a second elastic pinching slit, the first elastically flexible lip extending substantially between a second and a third lip of the body with-which it respectively delimits the first and the second elastic pinching slits, and the movable member is, at rest, in the position for unlocking the rod and, in the active position, is housed in the second housing in a position for locking the rod so that, through the forcible engagement of the rod in the first elastic pinching slit and towards the first housing while the movable member is not in the second housing, the rod can move the flexible lip sufficiently away from the second lip to enter the first housing, and so that next, the forcible engagement of the movable member in the second elastic pinching slit can move the flexible lip sufficiently away from the third lip to allow the movable member to be inserted into the second housing in its active position in which it holds the flexible lip in a position such that it rigidly opposes the exit of the rod out of the first housing, the said rod being able to leave the first housing forcibly by action on the flexible lip only after the forcible exit of the movable member out of the second housing.

In order to facilitate the manual operation of the movable member, the latter is advantageously an elongate and rigid bar substantially parallel to the axial direction of each housing and having longitudinal ends projecting axially on either side of the body of the clip and via which the bar can be moved at least from one to the other of its positions.

With the same purpose of facilitating the operation of the bar, whilst simultaneously allowing excellent positioning of this bar with respect to the rest of the clip, in its two rest and active positions, it is furthermore advantageous for the flexible means for connecting the movable member to the body to comprise two elastically deformable tabs each connecting one of the longitudinal ends of the movable member to the body in a way so as to form a frame which straddles at least part of the clip.

In a particularly advantageous embodiment, guaranteeing correct operation of the clip whilst allowing excellent fitting of the clip to the element to which it is to be secured, the rigid body of the clip has substantially the shape of a U-section, the wings of which, constituting at least one of the lips of the body are secured to a base the internal face of which delimits at least in part the first housing, the external face of the said base having tubular portions projecting with respect to the external faces of the said wings, the portions forming a dovetail for fitting the clip, and one of which is extended axially by at least one part for anchoring the flexible means for connecting the movable member to the body of the clip.

Such a clip may be produced from metal, but advantageously, it is produced from a plastic, preferably from polyamide, so as to constitute an articulation component made of plastic which can be interposed between, on the one hand, the metal anchoring rod secured to a support such as a seat cushion base and an element such as a metal tab of the seat cushion framework, which is mounted so that it can pivot relatively silently on the anchoring rod by means of the plastic clip.

By way of preferred application, the subject of the invention is also a device for the removable and pivoting connection of a raisable vehicle seat cushion on a base connected to the body of said vehicle, the device including at least one anchoring rod intended to be fixed on one of the two elements which are the base and a framework of the said seat cushion, and at least one member intended to be fixed on the other of the two elements and mounted removably and so that it can pivot on the said anchoring rod, forming a pivot pin, and the connection device according to the invention is characterized in that the said member is a clip such as defined previously.

Advantageously, the anchoring rod is fixed rigidly to the body of the vehicle, and the clip is fixed to a framework tab of the seat cushion. In addition, this fixing of the clip is advantageously obtained by a dovetail-shaped part of its body sliding in a profiled channel formed in the framework tab, and clamping elastically round the clip.

Figure 1:
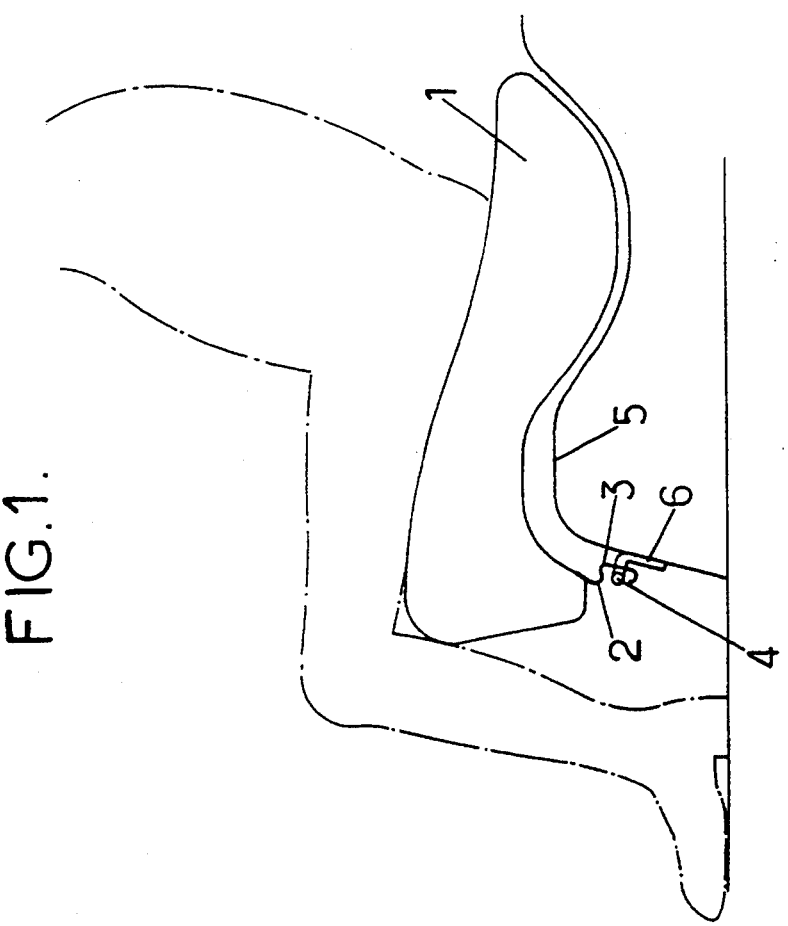
Figure 4:
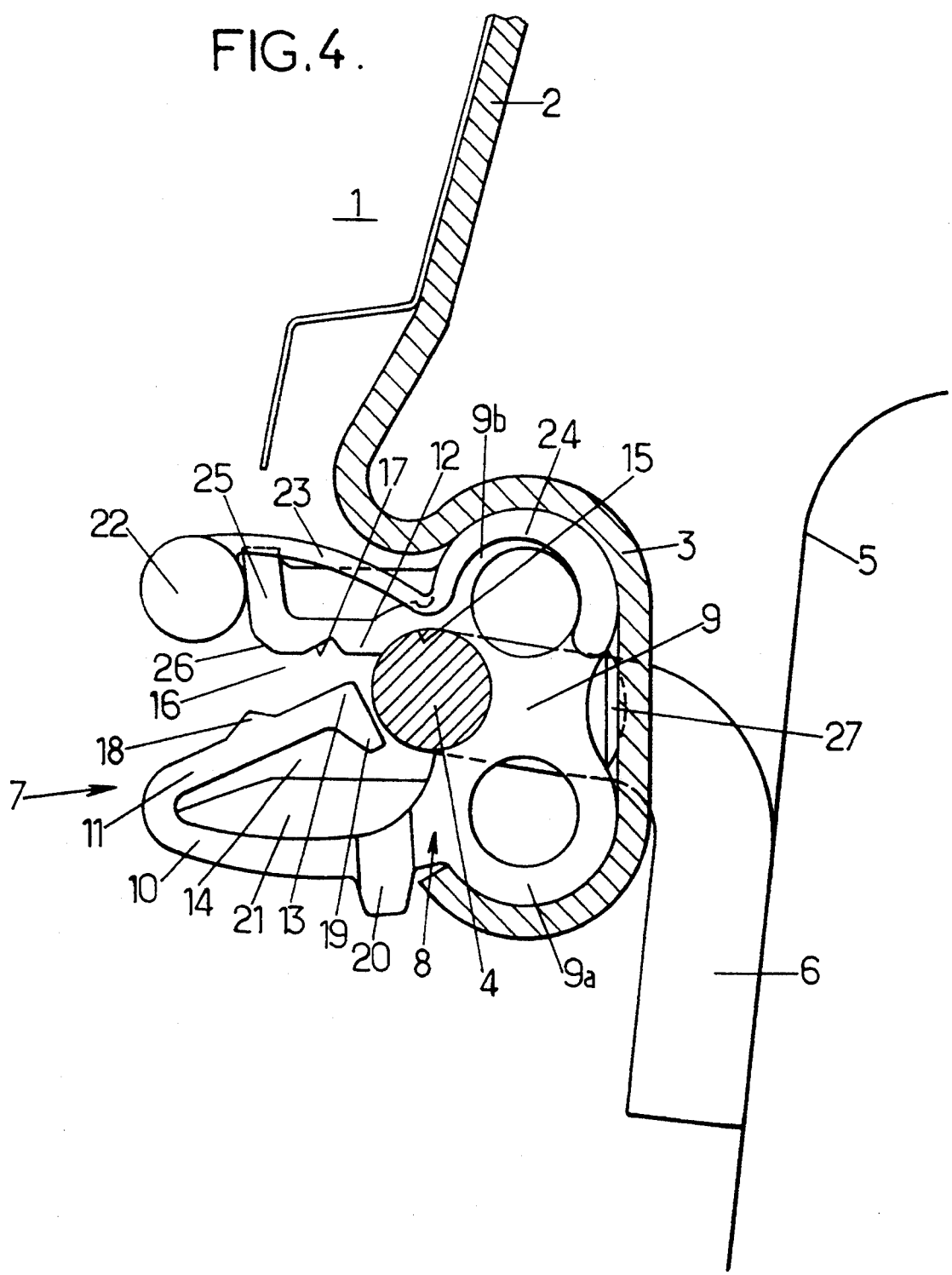
Figure 10:
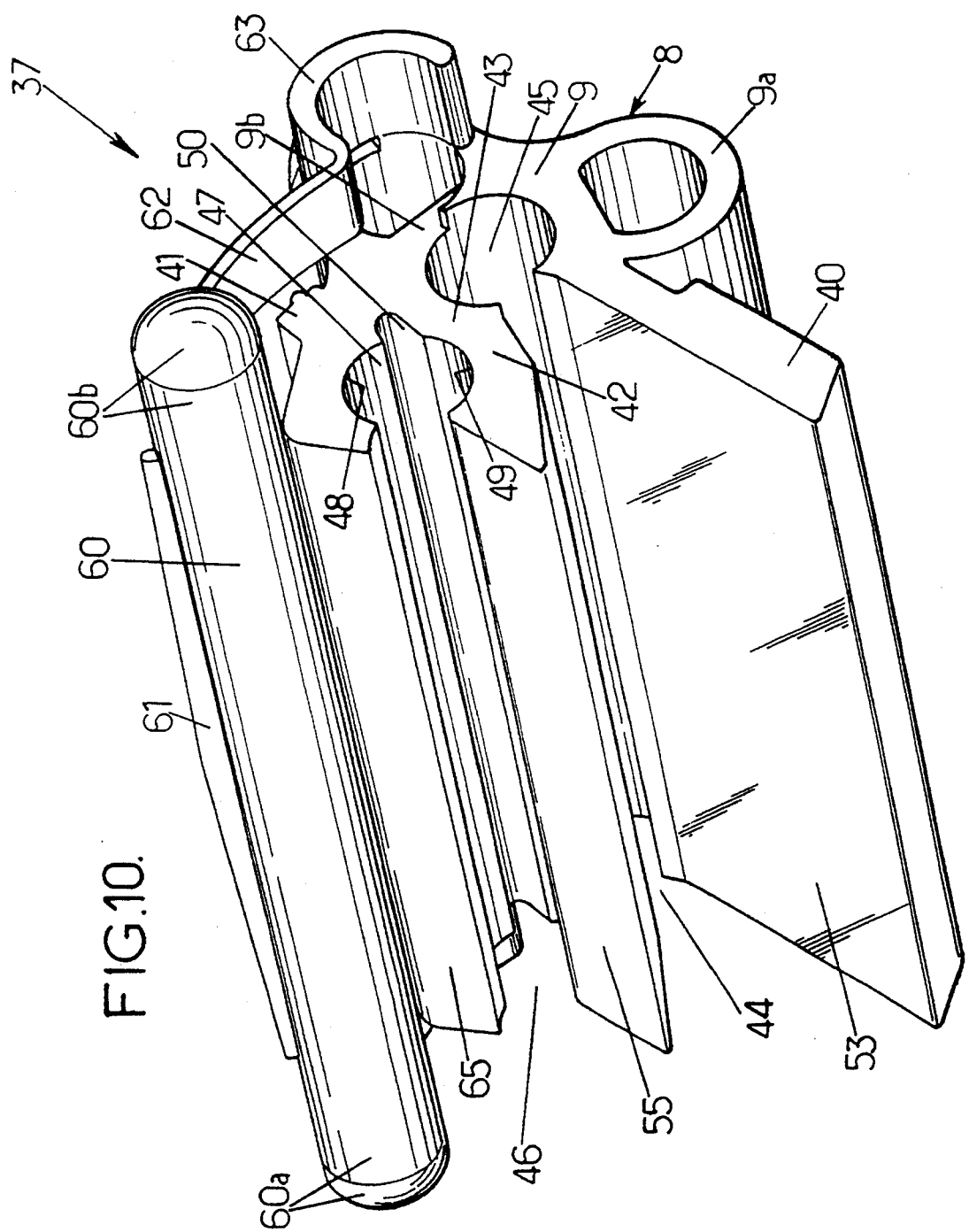
Figure 13:
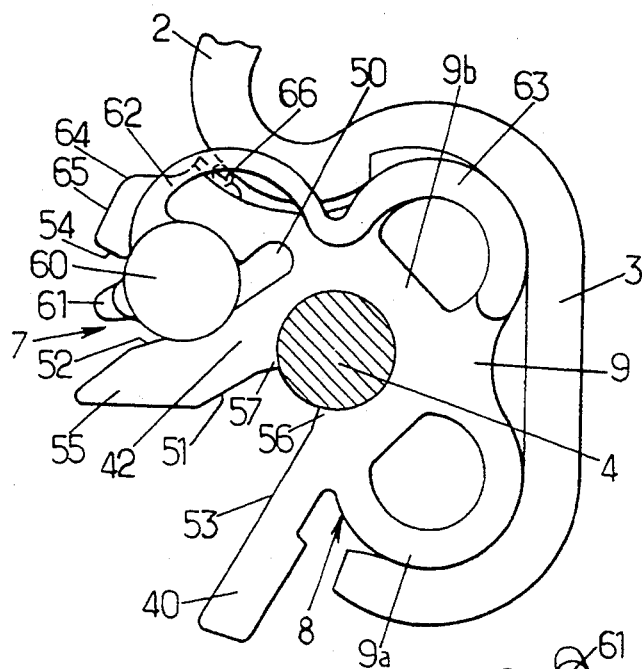
Figure 11:
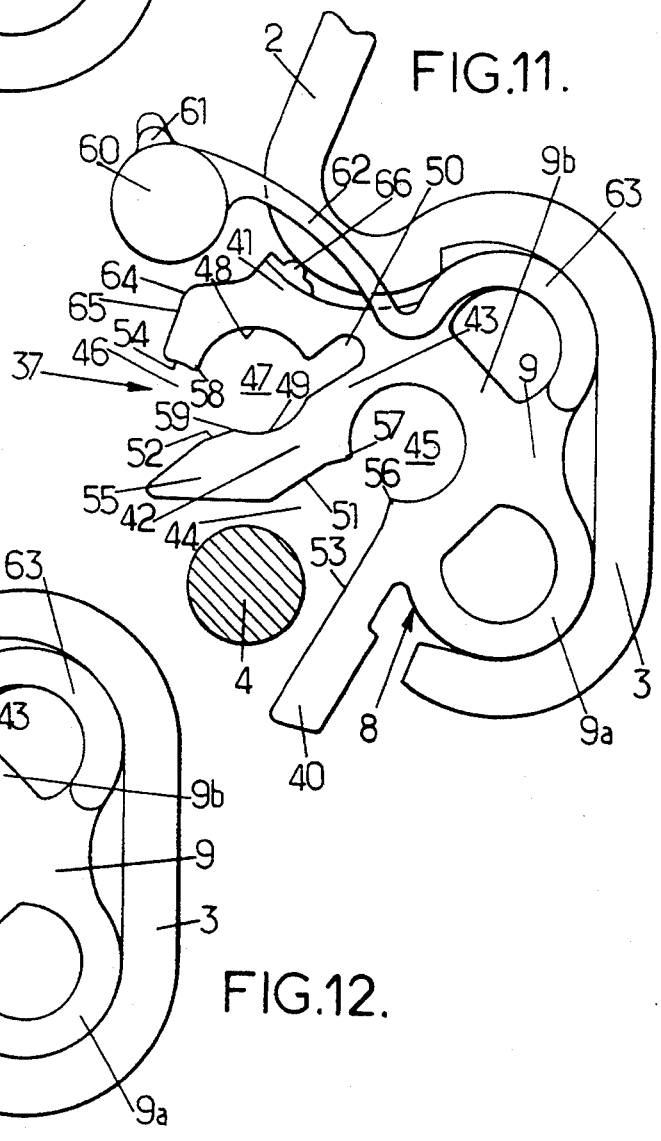
Figure 12:
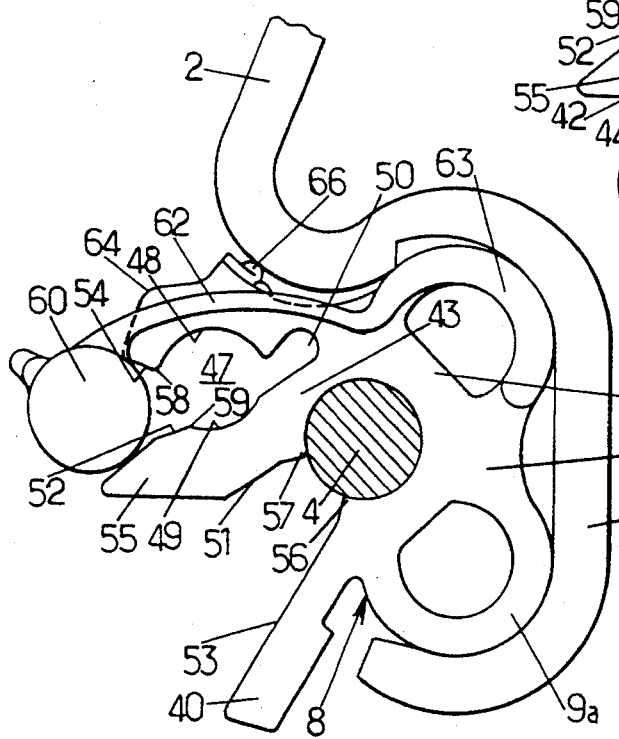

Other advantages and features of the invention will emerge from the description given hereinbelow by way of non-limiting example of an embodiment of a connection device and of a fixing clip according to the invention, with reference to the appended drawings in which:

FIGS. 1 and 2 are diagrammatic side elevation views of a motor vehicle rear seat cushion fitted so that it can pivot on a base, and represented respectively in the lowered or folded down position and in the raised position, FIG. 3 is a perspective view of a first example of clip fixed on a metal tab of the seat cushion framework, the clip being fitted on an anchoring rod secured to the base of the rear seat, FIG. 4 is a profile view, partially in section and partially in side-elevation, of the assembly represented in FIG. 3, FIGS. 5 to 9 are side elevation views of the clip and transverse sectional views of the anchoring rod representing the relative positions of the clip and of the rod in various configurations of use, FIGS. 5, 6 and 7 corresponding to successive fitting steps, FIG. 8 to an anti-tearout configuration, and FIG. 9 to an unlocked position, allowing the exit of the rod out of the clip, FIG. 10 is a perspective view of a second example of clip intended to be fixed to a metal tab of the seat cushion framework, to be fitted to an anchoring rod secured to the base of the rear seat, and FIGS. 11, 12 and 13 are side elevation views of the clip of FIG. 10 fixed to a framework tab and in transverse section of the anchoring rod with which the clip interacts, and representing relative positions of the clip and of the rod in various configurations of use, FIG. 11 corresponding to the configurations before fitting and locking and after dismantling and locking, FIG. 12 to a configuration with the rod molted in the clip and the locking member in the intermediate position, between its rest and locking positions, and FIG. 13 to the configuration for fitting and locking.

FIGS. 1 and 2 represent the raisable and removable seat cushion of a motor vehicle rear seat, of which the back rest, which can be folded down, is not represented. This seat cushion 1 comprises a cushion and a framework which includes metal tabs such as 2, each of which has, projecting under the seat cushion, an end part shaped into a profiled chapel 3 having a substantially C-shaped transverse section via which each of the tabs 2 is fitted removably and so that it can pivot about an anchoring rod 4 forming a pivot pin which is transverse with respect to the longitudinal and vertical plane of the vehicle and rigidly fixed to a seat base 5, itself secured to the body of the vehicle. The rod 4 consists of an inverted U-shaped metal hoop the two wings of which are bent in two substantially perpendicular planes and form uprights 6 rigidly connected to the base 5.

Each framework tab 2 is thus fitted to the base 5 by means of a removable and pivoting connection device including the anchoring rod 4 and a plastic articulation member which is not shown in FIGS. 1 and 2 but which is one or other of the two examples described hereinbelow with reference to FIGS. 3 to 12 and which is fixed so that it cannot be dismantled on the tab 2 by being forcibly fitted into its C-shaped profiled channel 3 as shown in FIGS. 4 and 11 to 13. This articulation member may be fitted about the rod 4 and dismantled from the latter by manual operation and, in the fitted position, can rotate freely about the rod 4. Thus the seat cushion 1 may be tilted from one to the other of the two positions of FIGS. 1 and 2, which are respectively a lowered position, to receive a passenger whose outline is represented diagrammatically in chain line, and a raised position to increase the storage volume available and to fit the seat cushion 1 on the base 5 or dismantle it from the latter.

With reference to FIGS. 3 and 4, the first example of an articulation member is a manually operated clip 7 or fastener which comprises a relatively rigid body 8 having substantially the shape of a U-shaped section the base 9 of which consists of two adjacent tubular portions of cylinder 9a, 9b giving it a substantially 8-shaped transverse section. This base 9 supports the two wings of the U-shaped profile which each extend from one of the tubular portions 9a and 9b respectively, and one of which is a slightly convex rigid wall 10 carrying, via its free end, a flexible lip 11, the other wing being a fixed lip 12 which extends substantially parallel to the wall 10. The flexible lip 11 extends from one of its ends via which it is joined in an elastically flexible manner to the wall 10, to its other end 13 which is free. In its rest position, the flexible lip 11 is inclined so that, its free end 13 points towards the fixed lip 12 and towards the inside of a substantially U-shaped central recess 14 delimited in the body 8 and the bottom of which, essentially formed by the internal face of the base 9, is partly shaped into a housing 15 in the form of a portion of a cylinder of circular cross-section (see FIGS. 5 and 6) capable of receiving the anchoring rod 4. The inclination of the flexible lip 11 in its rest position is such that its free end 13 faces the housing 15, whose axis is parallel to those of the tubular portions of the base 9. The two lips 11 and 12 delimit between them an elastic pinching slit 16 via which the recess 14 opens towards the outside, and whose width decreases from the outside towards the inside of the housing 14. The, fixed lip 12 has, in its face directed towards the flexible lip 11, a groove 17 of V-shaped cross-section opening out towards the flexible lip 11 and substantially parallel to the axis of the housing 15. The flexible lip 11 has, in projection on its face directed towards the fixed lip 12, a projection 18 which is substantially parallel to the axis of the housing 15. On one side of the clip 7, in the axial direction, the free end 13 of the flexible lip 11 has, projecting towards the wall 10, a locking heel 19 which can be retracted into a facing slot 20 formed in the wall 10 on the same side of the clip 7 when the flexible lip 11 is bent towards the wall 10. In the axial direction, on the side of the clip 7 opposite the one having the slot 20, the wall 10 has an excess thickness 21 which sufficiently stiffens the end of the flexible lip 11 connected to the wall 10 and which above all makes the part of the flexible lip 11 which is adjacent to its free end 13 flexible, which gives good positioning of the virtual axis of rotation of the flexible lip 11.

The clip 7 also comprises a movable member 22 which is a rigid elongate cylindrical bar of circular cross-section substantially parallel to the axis of the housing 15 and whose longitudinal ends 22a, 22b project axially on either side of the body 8. This bar 22 is connected to the body 8 by flexible means which are two elastically deformable tags 23 each connecting one of the ends 22a, 22b of the bar 22 to the body 8 by forming, with the latter and with the bar 22 a frame which straddles the fixed lip 12. Each tag 23 is attached to the body 8 by an anchoring part 24 in the form of a circular arc which extends axially, on the corresponding side, that one 9b of the two tubular portions 9a, 9b of the base 9 to which the fixed lip 12 is attached, and the tags 23 elastically return the bar 22 to its rest position corresponding to a position allowing locking for the rod 4 in the housing 15, and in which the bar is in abutment against an external rim 25 of the fixed lip 12 which also has, between its rim 25 and its groove 17, an incline 26 forming a chamfer for entering the slit 16.

The external face of the base 9 of the body of the clip projects, via its tubular portions 9a, 9b, with respect to the external faces of the wall 10 and of the fixed lip 12 so that the base 9 has a dovetail shape allowing the clip 7 to be fitted onto a tab 2 by the clip 7 sliding in the axial direction of the housing 15 in the profiled channel 3 of the tab 2, which clamps elastically around the base 9 of the body of the clip, the clip 7 being stopped in a centred position in the channel 3 for example using two studs such as 27 (only one of which is represented in FIG. 4) projecting from the external face of the base 9 and becoming blocked against the tab 2, for example in a recess (not represented in FIG. 4) formed in the bottom of the channel 3.

The clip 7, of which the structure and fitting on to the framework tab 2 of the seat cushion have Just been described, operates in the following manner: upon fitting the seat cushion 1 on its base 5, the seat cushion is offered up in the raised position, as shown in FIG. 2. The relative position of the anchoring rod 4 and of the clip 7 is that represented in FIG. 5, considering the clip 7 to be above the rod 4. Pushing downwards on the seat cushion 1 moves downwards the clip 7 of each tab 2 towards the rod 4, which is forcibly engaged in the slit 16. As represented in FIG. 6, the rod 4 elastically pushes back the flexible lip 11, which bends towards the wall 10, the heel 19 projecting into the slot 20, and the rod 4 can penetrate into the central recess 14 of the clip by passing beyond the projection 18 and the groove 17. At the end of the insertion movement, the rod 4 is received in the housing 15 (see FIG. 7), in a position which allows a relative pivoting of the clip 7 and of the rod 4, forming a pivot pin, this rod 4 then being held locked in this position by the elastic return of the flexible lip 11 to its rest position, in which the free end 13 and the locking heel 19 of this flexible lip 11 oppose the exit of the rod 4 out of its housing 15. It is to be noted that in the fitted position (FIG. 7), there remains an operational clearance between, on the one hand, the rod 4 and, on the other hand, the free end 13 and the heel 19 of the flexible lip 11, which prevents any parasitic noise and allows the free rotation of the clip 7 about the rod 4 without this rotation giving rise to a parasitic movement of the lip 11 which could lead to an accidental release of the rod 4. In this position of FIG. 7, the seat cushion 1, placed in the raised position necessary for fitting it (FIG. 2) may be folded down into the position of use of FIG. 1. Subsequently, the seat cushion 1 can be manipulated freely to pass alternately from one to the other of the positions of FIGS. 1 and 2.

The dismantling of the seat cushion is obtained in the following way: with the user seated on the seat (see the silhouette of FIG. 1), he or she can, from this position, bend over and manually grasp the bar 22 at rest, and in particular its ends which project axially from the two sides of the clip 7 and from the framework tab 2. From the rest position of the bar 22, against the rim 25 of the fixed lip 12, the user can manually push the bar 22 into the entrance of the elastic pinching slit 16 by making it slide along the incline 26 of the lip 12, by deformation of the tags 23. In the same way as the rod 4, the bar 22 can be inserted into the slit 16 elastically pushing back the flexible lip 11 towards the wall 10, until an active, termed locking, position is reached (see FIG. 9) in which the bar 22 bears in the groove 17 of the fixed lip 12 and behind the projection 18 of the flexible lip 11, which gives it a stable support and guarantees that it is held in this position, in which the flexible lip 11 is moved sufficiently away from the fixed lip 12 for the rod 4 to be able to engage between the two lips 11 and 12 and leave its housing 15, and therefore the clip 7, by sliding in the slit 16. The rod 4 and the bar 22 being in the position of FIG. 9, the user can then raise the seat cushion into the position of FIG. 2, without the bar 22 leaving its unlocked position of FIG. 9. With the seat cushion 1 raised, a simple pulling force exerted on it and upwards is sufficient to make the rod 4 exit from the clip 7 by sliding in the slit 16, because the bar 22 is holding the flexible lip 11 sufficiently away for this purpose. In exiting the clip 7, the rod 4 pushes in front of it the bar 22 which, by an effect of the elastically deformable tags 23, is returned to its rest position against the rim 25, as represented in FIG. 5. The bar 22 is then moved from its active unlocked position to its rest position by the rod 4, when the latter is disengaged from the elastic pinching slit 16, upon its release from the clip 7.

At the end of the dismantling operation, the clip 7 is again in the configuration represented in FIG. 5, in which the flexible lip 11 and the bar 22 respectively occupy their rest position, that is to say that the clip 7 is ready to be fitted onto a rod 4 again without requiring any manual intervention whatsoever.

If, from the fitted and capable of pivoting position of FIGS. 3, 4 and 7, the user attempts to tear out or remove the seat cushion 1 from its base 5 without beforehand carrying out the manual operation of placing the bar 22 in the unlocked position as described previously with reference to FIG. 9, the flexible lip 11 starts to bow under the force and opposes a resistive force which is greater than the normal dismantling force. If the user persists in his attempt to tear the seat out, the tearing out force exerted by the rod 4 on the flexible lip 11 has the effect of raising this lip 11 and moving it away from the wall 10 until its free end 13 comes to bear in the groove 17 of the fixed lip 12. In this position for anchoring the flexible lip 11 against the fixed lip 12 (see FIG. 8), the heel 19 of the flexible lip 11 prevents the exit of the rod 4 from its housing 15. In this configuration, tearing the rod 4 out of the clip 7 requires forces which are very much greater than the normal dismantling force. If, nevertheless, the user exerts abnormally high forces and forces on the flexible lip 11 which is bearing in the groove 17, he can get the rod 4 out of the clip 7 by bending and pushing the flexible lip 11 outwards and by bending it back on itself, without, however, destroying it due to its flexibility. Subsequent refitting of the clip 7 on the rod 4 will require a manual operation beforehand for returning the flexible lip 11 to a suitable position, that is to say to its rest position of FIG. 5.

With reference to FIGS. 10 and 11, the second example of an articulation member is a manually operated clip 37 on which can again be found a rigid body 8 having the shape of a U-shaped profile with a base 9 consisting of two adjacent tubular cylinder portions 9a and 9b giving it a substantially 8-shaped transverse section. This base 9 supports the two wings of the U-shaped profile, which each extend from one of the tubular portions 9a and 9b respectively moving away from one another towards the outside of the U, and one of which is a substantially rectilinear rigid lip 40, secured to the tubular portion 9a, and the other of which is a rigid lip 41 of substantially outwardly convex shape and secured to the tubular portion 9b. A flexible lip 42 extends between the rigid lips 40 and 41 being joined in an elastically flexible manner to the tubular portion 9b by an end connection part 43 which becomes thinner towards this portion 9b to form a hinge zone. The flexible lip 42 delimits, together with the rigid lip 40, an elastic pinching slit 44 via which a housing 45, capable of receiving the anchoring rod 4, opens towards the outside of the clip 37. This housing 45, in the form of a cylinder portion of circular cross-section, is essentially formed in the internal face of the base 9 and partly delimited by a concave face of the hinge zone 43. Together with the other rigid lip 41, the flexible lip 42 delimits another elastic pinching slit 46 via which another housing 47, substantially in the form of a cylinder portion of circular cross-section, opens towards the outside of the clip 37. This housing 47 is delimited between two concave parts 48 and 49 pointing towards one another, one, 48, of which is exhibited by the internal face of the lip 41 facing the flexible lip 42, and the other, 49, of which is exhibited by the face of the flexible lip 42 facing the lip 41. On the side opposite the housing 45 the hinge zone 43 is delimited by a recess 50 with a rounded bottom, extending from the housing 47 on the side opposite the slit 46 and towards the tubular portion 9b. In its rest position, the flexible lip 42 is inclined so that its planar lateral faces 51 and 52 of its central part move progressively and respectively away from the planar internal face 53 of the lip 40 and from the planar face 54 of the free end part of the lip 41, so that the slits 44 and 46 widen progressively from the housings 45 and 47 towards the outside of the clip. In addition, the free end part 55 of the flexible lip 42 is shaped into a bevel towards the outside of the clip 37, and thus has two inclined planar faces which converge towards one another and towards the outside of the body 8, and which delimit chamfers for entering the slits 44 and 46 with the respectively facing parts on the faces 53 and 54 of the lips 40 and 41. The axes of the substantially cylindrical recesses 45 and 47, and of the tubular portions 9a and 9b are substantially parallel to one another. The rigid lip 40 has, level with the joint of its internal face 53 with the wall of the recess 45, a projection 56 projecting towards the flexible lip 42 and substantially parallel to the axial direction of the housing 45. Likewise the flexible lip 42 has, at the joint between the planar face 51 of its central part with the concave face of its hinge zone 43 which partially delimits the housing 45, a projection 57 projecting towards the fixed lip 40 and substantially parallel to the axial direction of the housing 45. The fixed lip 40 may, as a variant, also include another axial projection, similar to the projection 56 but projecting from the face 53 towards the projection formed on the flexible lip 42 by the joint of the planar face 51 of its central part with the inclined face which extends at its end into a bevel 55, it being possible for this projection on the flexible lip 42 to be a more marked projection. In a similar manner, on the other fixed lip 41, the joint between the planar face 54 of its free end part and the concave face 48 forms a projection 58, parallel to the axis of the housing 47 and projecting towards a less marked parallel axial projection formed on the flexible lip 42 by the joining of the concave face 49 and planar face 52.

The clip 37 also comprises a movable member 60, which is a cylindrical elongate rigid bar of circular cross-section, substantially parallel to the axis of the housing 17, and of which the longitudinal ends 60a and 60b project axially on either side of the body 8. This bar 60, stiffened by an axial rib 61, is connected to the body 8 by flexible means which are two elastically deformable tags 62 each connecting one of the ends 60a and 60b of the bar 60 to the body 8, forming, with the latter and with the bar 60 a frame which straddles the fixed lip 41. Each tag 62 is attached to the body 8 by an anchoring part 63 in the form of a circular arc which extends axially, on the corresponding side, the tubular portion 9b of the base 9 to which the fixed lip 41 is attached, and the tags 62 tend to return the bar 60 elastically to its rest position, in which it allows unlocking of the rod 4 and is in abutment against an external rim 64 of the fixed lip 41 which also has an incline 65 between its rim 64 and its face 54 of the chamfer for entering the slit 46.

As for the clip 7, the external face of the base 9 of the body of the clip 37 projects, via the tubular portions 9a and 9b, with respect to the external faces of the fixed lips 40 and 41 so that the base 9 has a dovetail shape allowing the clip 37 to be mounted on a tab 2 by the clip 7 sliding in the axial direction of the housings 45 and 46 and of the tubular portions 9a and 9b, in the profiled channel 3 of the tab 2, which clamps elastically around the base 9 of the body of the clip, the clip 37 being stopped in a centred position in the channel 3 for example with the aid of a striated rib 66 extending axially on the back of the fixed lip 41, in that part of this lip which is attached to the tubular portion 9b. By bearing against the junction portion of the channel 3 with the rest of the tab 2, the striated rib 66 also makes it possible to stiffen the fixed lip 41 in a position for slightly clamping the housing 47 with respect to the diameter of the bar 60, which is intended to be clipped elastically into the housing 47, after insertion of the anchoring rod 4 into the housing 45, by elastic clipping in.

The clip 37, of which the structure and fitting on to the framework tab 2 of the seat cushion have just been described, operates in the following manner: upon fitting the seat cushion 1 on its base 5, the seat cushion is offered up in the raised position, as shown in FIG. 2. The relative position of the anchoring rod 4 and of the clip 37 is that represented in FIG. 11, considering the clip 37 to be above the rod 4. Pushing downwards on the seat cushion i moves downwards the clip 37 of each tab 2 towards the rod 4, which is forcibly engaged in the slit 44. The rod 4 elastically pushes back the flexible lip 42, which bends and pivots via its hinge zone 43 towards the other fixed lip 41, which opens the slit 44, then the rod 4 can penetrate into the recess 45 by passing beyond the projections 56 and 57 following which the flexible lip 42 returns to its initial position, towards the fixed lip 40, so that the rod 4 is retained in the housing 45, as represented in FIG. 12, without, however, being locked in this housing 45, with respect to a tearing out tending to extract the rod 4 from this housing. In the housing 45, the rod 4 is in a position allowing relative pivoting of the clip 37 and of the rod 4, forming a pivot pin.

To prevent any accidental release of the rod 4, the latter is locked in position in the housing 45 with the aid of the bar 60, removed from its rest position outside the body 8, as shown in FIG. 11, as far as its active, termed locking, position inside the housing 47. This is obtained by moving the bar 60 beyond the external rim 64 and the external incline 65 of the fixed lip 41 to bring the bar 60, by elastic deformation of the tags 62, into an intermediate position represented in FIG. 12 in which this bar 60 is in the chamfer for entrance to the slit 46, bearing simultaneously against the face 54 of the lip 41 and against the bevelled part 55 of the flexible lip 42. This movement (from the position of FIG. 11 to that of FIG. 12) is obtained by moving the bar 60 about the free end part of the fixed lip 41.

From the intermediate position of FIG. 12, the forcible engagement of the bar 60 in the slit 46 makes it possible to move the flexible lip 42 sufficiently away from the fixed lip 41 by bending and deformation of the central part and of the bevel 55 of the flexible lip 42 towards the other fixed lip 40 until it allows the insertion of the bar 60 in the housing 47 by insertion beyond the projections 58 and 59. When the bar 60 is in the housing 47, the subsequent elastic return of the flexible lip 42 retains it in this position, in which the bar 60 prevents any pivoting or bending of the flexible lip 42 via its hinge zone 43 so that the bar 60 holds this lip 42 in a position such that it rigidly opposes the opening of the slit 44, necessary for the exit of the rod 4 from the housing 45. The bar 60 is then in its locked position in the housing 47 as represented in FIG. 13 and, by its presence, holds the flexible lip 42 in a position which traps the rod 4 in the housing 45. In this position of FIG. 13, the seat cushion 1, placed in the raised position necessary for fitting it (FIG. 2) may be folded down into the position of use of FIG. 1. Subsequently, the seat cushion 1 can be manipulated freely to pass alternately from one to the other of the positions of FIGS. 1 and 2.

Possibly, the locking by manual operation of the bar 60 may take place after folding the seat cushion 1 down into the position of use of FIG. 1 by pivoting about the rod 4 which is inserted into the housing 45.

The dismantling of the seat cushion is obtained in the following way: with the user seated on the seat (see the silhouette of FIG. 1) he or she may, from this position, bend over and manually grasp the ends 60a and 60b of the locking bar 60 which project axially from the two sides of the clip 37 and from the framework tab 2. From the locked position of the bar 60 (see FIG. 6), the user can manually and forcibly push this bar 60 towards the outside of the housing 47 by opening the elastic pinching slit 46 by deformation of the elastic lip 42 towards the fixed lip 40 until the bar 60 can leave the housing 47 and slide towards the outside in the slit 46, after passing over the sufficiently separated projections 58 and 59. From the locked position (FIG. 13), the bar 60 is thus returned to the intermediate position of FIG. 12, from which it can be returned to the rest position of FIG. 1 by passing, by elastic deformation of the tags 62, around the free end part of the fixed lip 41. With the bar 60 in the position of FIG. 12 or FIG. 11, whilst the rod 4 is still in the housing 45, the user can then raise the seat cushion into the position of FIG. 2, and a simple pulling force exerted on it and upwards is then sufficient to forcibly make the rod 4 exit from its housing 45, by opening the elastic pinching slit 44 which is obtained by bending the flexible lip 42 in its hinge zone 43 and passing the rod 4 beyond the sufficiently separated projections 56 and 57 so that at the end of the dismantling operation the clip 37, its locking bar 60 and the rod are located once again in the configuration of FIG. 11.

Thus, after forcible insertion of the rod 4 into the housing 45, locking in this position is obtained by subsequent insertion of the bar 60 into, the housing 47. Upon dismantling, the rod 4 can only forcibly leave the housing 45 by action on the flexible lip 42 only after the forcible exit of the bar 60 out of the housing 47.

So that the assembly of the clip 7 or 37 is arranged so that it can operate in the fashion described hereinabove, it is indicated that the clip 7 or 37 is produced from a plastic material having good elasticity properties, so as to promote the elastic functions necessary for the correct operation of the clip by means of the material itself, without requiring additional members such as metal springs. Preferably, the clip 7 37 is produced from natural polyamide, although other plastics are equally usable. The plastic clip 7 or 37 interposed between a metal anchoring rod 4 and a metal framework tab 2 additionally guarantees noiseless sliding over metallic components, and prevents any metal-metal contact so that the connection device thus produced is silent.

The invention is not limited to the example described hereinabove but encompasses all variants thereof. In particular, instead of fixing the clip 7 or 37 to the framework tab 2 of the seat cushion i and the rod 4 to the base 5, it is possible to fix the clip 7 or 37 to the base 5 and the rod 4 to the framework of the seat cushion 1. For each device for connecting the seat cushion 1 to the base 5, a clip 7 or 37 interacting with a rod 4 has been described. However, the rod 4 may be an elongate shaft on which are mounted several clips such as 7 or 37 or, in contrast, the rod 4 may be formed of several coaxial rod elements, on which a single clip is mounted. Furthermore, the body of the clip has a base in the shape of a dovetail which facilitates its fixing on one of the two elements to be connected, by virtue of two tubular portions simultaneously having the advantages of giving this base good rigidity, saving on material and lending themselves favourably to manufacture by injection moulding of plastic as components of substantially constant thickness, but other embodiments of the base are possible.

What is claimed is:

1. A manually operated clip for removably joining two elements such that the elements can pivot, said clip, in use, being adapted to be carried by one of the elements and being adapted to removably engage an anchoring rod carried by the other of the two elements, the anchoring rod functioning as a pivot pin, said clip comprising:

a relatively rigid body having a U-shaped central recess forming a housing adapted to receive an anchoring rod, said housing being open to the outside of the body by an elastic pinching slit which widens towards the outside of said body, said pinching slit being delimited between two lips of the body, a first of said two lips being elastically flexible, one end of said flexible lip being joined to a wall of said body and the other end of said flexible lip being free, said flexible lip being movable between a rest position in which the flexible lip is inclined such that its free end points towards the second of the two lips and towards the inside of the recess, and a pushed back position in which the flexible lip is pushed back towards the wall of the body to which it is attached whereby, in use, and when the flexible lip is in its pushed back position, an anchoring rod can be moved into and out of said recess; and a movable member, said member being flexibly connected to said body and being movable between a rest position in which it is outside the body and an active position in which it is in said pinching slit; the clip being arranged, in use, such that forcible movement of an anchoring rod through said pinching slit when the movable member is not in its active position can push back the flexible lip to its pushed back position to allow the rod to be inserted into said recess to allow a relative pivoting of the clip and the rod, such that, when a rod is moved into said recess, the flexible lip can return elastically to its rest position in which its free end constitutes a locking means opposing the exit of a rod from said recess, and such that movement of said movable member into said active position in said pinching slit causes the flexible lip to move from its rest position to its pushed-back position whereby an anchoring rod can be moved out of said recess and through said pinching slit in order to disengage the clip from the rod.

2. Clip according to claim 1, wherein said recess is substantially circular between said pinching slit and wherein the movable member is an elongate and rigid bar substantially parallel to the axial direction of the recess and having longitudinal ends projecting axially on either side of the body of the clip and by which the movable member can be moved at least from one to the other of its rest and active positions.

3. Clip according to claim 1, wherein the movable member is flexibly connected to the body by two elastically deformable tags each tag connecting one of the longitudinal ends of the movable member to the body, said movable member and said tags forming a frame which straddles at least part of the clip.

4. Clip according to claim 1, wherein tile rigid body of the clip has substantially the shape of a U-section, the legs of the U-shaped body, constituting at least one of said lips, being secured to a base portion of said body, an internal face of the base delimiting at least part of said recess, an external face of said base portion having tubular portions projecting with respect to external faces of said legs, said tubular portions forming a dovetail for, in use, attaching the clip to an element, at least one of said tubular portions being extended axially for anchoring the movable member to the body of the clip.

5. A clip according to claim 1, fabricated of plastic.

6. A manually operated clip for removably joining two elements such that the elements can pivot, said clip, in use, being adapted to be carried by one of the elements and being adapted to removably enage an anchoring rod carried by the other of the two elements, the anchoring rod functioning as a pivot pin, said clip comprising:

a relatively rigid body having a first-housing adapted to receive an anchoring rod and a second housing adapted to receive a movable member, said first housing being open to the outside of the body by respective first and second elastic pinching slits which widen towards the outside of the body, said first pinching slit being delimited between two lips of the body, one of the two lips of the first pinching slit being elastically flexible, said second pinching slit also being delimited between two lips of the body, one of the two lips of the second pinching slit being said elastically deformable lip;

a movable member, said movable member being flexibly connected to said body and being movable between a rest position in which it is outside the body to an active position in said second housing;

said rigid body being substantially U-shaped in section, one of the legs of the U-shaped body, constituting at least one of the lips, being secured to a base portion of said body, an internal face of the base portion delimiting at least part of said first housing, an external face of said base portion having tubular portions projecting with respect to external faces of said legs, said tubular portions forming a dovetail for, in use, attaching the clip to one of the two elements, at least one of said tubular portions being extended axially for anchoring the movable member to the body of the clip;

the clip being arranged, in use, such that when the movable member is not in said active position in said second housing, forcible engagement of a rod in said first elastic pinching slit and towards the first housing can move the flexible lip sufficiently away from the other lip of the first pinching slit to allow the rod to enter the first housing, such that forcible engagement of the movable member in the second pinching slit towards the second housing can move the flexible lip sufficiently away from the other lip of the second pinching slit to allow the movable member to enter the second housing into its active position in the body, in which active position the movable member holds the flexible lip in a position such that the flexible lip rigidly opposes the exit of a rod out of the first housing, and such that, when the movable member is moved out of its active position in said second housing, a rod can be removed from said first housing by being passed through said first pinching slit.

7. Clip according to claim 6, wherein said first and second housings are substantially circular between said pinching slits, wherein the movable member is an elongate and rigid bar substantially parallel to the axial direction of the housings, and wherein said movable member has longitudinal ends projecting axially on either side of the body of the clip and by which the movable member can be moved at least from one to the other of its rest and active positions.

8. Clip according to claim 6, wherein the movable member is flexibly connected to the body by two elastically deformable tags each connecting one of the longitudinal ends of the movable member to the body so as to form a frame which straddles at least part of the clip.

9. Clip according to claim 6, fabricated of plastic.

10. Device for the removable and pivoting connection of a raisable vehicle seat cushion on a base connected to the body of said vehicle, said device including at least one anchoring rod intended, in use, to be fixed on one of the seat cushion and base, and at least one clip intended, in use, to be fixed on the other of the seat cushion and base for removably joining the seat cushion and base such that the seat cushion and base can pivot about said anchoring rod, said clip comprising:

a relatively rigid body having a U-shaped central recess forming a housing adapted to receive an anchoring rod, said housing being open to the outside of the body by an elastic pinching slit which widens towards the outside of said body, said pinching slit being delimited between two lips of the body, a first of said two lips being elastically flexible, one end of said flexible lip being joined to a wall of said body and the other end of said flexible lip being free, said flexible lip being movable between a rest position in which the flexible lip is inclined such that its free end points towards the second of the two lips and towards the inside of the recess and a pushed back position in which the flexible lip is pushed back towards the wall of the body to which it is attached whereby, in use, and when the flexible lip is in its pushed back position, an anchoring rod can be moved into and out of said recess; and a movable member, said member being flexibly connected to said body and being movable between a rest position in which it is outside the body to an active position in said pinching slit;

the clip being arranged, in use, such that forcible movement of an anchoring rod through said pinching slit when the movable member is not in its active position can push back the flexible lip to its pushed back position to allow the rod to be inserted into said recess to allow a relative pivoting of the clip and the rod, such that, when a rod is moved into the recess, the flexible lip can return elastically to its rest position in which its free end constitutes a locking means opposing the exit of a rod from said recess, and such that movement of said movable member into said active position in said pinching slit causes the flexible lip to move from its rest position to its pushed back position whereby an anchoring rod can be moved out of said recess and through said pinching slit in order to disengage the clip from the rod.

11. Device according to claim 10, wherein the anchoring rod is adapted to be fixed rigidly to the body of a vehicle, and wherein the clip is adapted to be fixed to a framework tab of a seat cushion.

12. Device according to claim 11, wherein the body of the clip has a dovetail-shaped part adapted to slide in a profiled channel formed in a framework tab of a seat cushion for clamping elastically around the clip.

13. Device for the removable and pivoting connection of a raisable vehicle seat cushion on a base connected to the body of said vehicle, said device including at least one anchoring rod intended, in use, to be fixed on one of the seat cushion and base, and at least one clip intended, in use, to be fixed on the other of the seat cushion and base for removably joining the seat cushion and base such that the seat cushion and base can pivot about said anchoring rod, said clip comprising:

a relatively rigid body having a first housing adapted to receive an anchoring rod and a second housing adapted to receive a movable member, said first housing being open to the outside of the body by respective first and second elastic pinching slits which widen towards the outside of the body, said first pinching slit being delimited between two lips of the body, one of the two lips of the first pinching slit being elastically flexible, said second pinching slit also being delimited between two lips of the body, one of the two lips of the second pinching slit being said elastically deformable lip;

a movable member, said movable member being flexibly connected to said body and being movable between a rest position in which it is outside the body to an active position in said second housing;

said rigid body being substantially U-shaped in section, one of the legs of the U-shaped body, constituting at least one of the lips, being secured to a base portion of said body, an internal face of the base portion delimiting at least part of said first housing, an external face of said base portion having tubular portions projecting with respect to external faces of said legs, said tubular portions forming a dovetail for, in use, attaching the clip to one of the two elements, at least one of said tubular portions being extended axially for anchoring the movable member to the body of the clip;

the clip being arranged, in use, such that when the movable member is not in said active position in said second housing, forcible engagement of a rod in said first elastic pinching slit and towards the first housing can move the flexible lip sufficiently away from the other lip of the first pinching slit to allow the rod to enter the first housing, such that forcible engagement of the movable member in the second pinching slit towards the second housing can move the flexible lip sufficiently away from the other lip of the second pinching slit to allow the movable member to enter the second housing into its active position in the body, in which active position the movable member holds the flexible lip in a position such that the flexible lip rigidly opposes the exit of a rod out of the first housing, and such that, when the movable member is moved out of its active position in said second housing, a rod can be removed from said first housing by being passed through said first pinching slit.

14. Device according to claim 13, wherein the anchoring rod is adapted to be fixed rigidly to the body of a vehicle, and wherein the clip is adapted to be fixed to a framework tab of a seat cushion.

15. Device according to claim 14, wherein the body of the clip has a dovetail-shaped part adapted to slide in a profiled channel formed in a framework tab of a seat cushion for clamping elastically around the clip.

* * * * *